United States Patent
Isaak

(10) Patent No.: US 9,894,736 B2
(45) Date of Patent: Feb. 13, 2018

(54) STREET AND ROADWAY LIGHTING DISTRIBUTION MAP

(71) Applicant: EVARI GIS CONSULTING, INC., San Diego, CA (US)

(72) Inventor: Ari Isaak, San Diego, CA (US)

(73) Assignee: EVARI GIS CONSULTING, INC., San Diego, CA (US)

( * ) Notice: Subject to any disclaimer, the term of this patent is extended or adjusted under 35 U.S.C. 154(b) by 0 days.

(21) Appl. No.: 15/098,660

(22) Filed: Apr. 14, 2016

(65) Prior Publication Data
US 2017/0303372 A1 Oct. 19, 2017

(51) Int. Cl.
*H05B 33/08* (2006.01)
*H05B 37/02* (2006.01)
*G05D 25/02* (2006.01)

(52) U.S. Cl.
CPC ........ *H05B 37/0245* (2013.01); *G05D 25/02* (2013.01); *H05B 33/0842* (2013.01)

(58) Field of Classification Search
CPC . H05B 37/0245; H05B 33/0815; G05D 25/02
See application file for complete search history.

(56) References Cited

U.S. PATENT DOCUMENTS

| | | | | |
|---|---|---|---|---|
| 2013/0285556 A1* | 10/2013 | Challapali | .......... | H05B 37/0245 315/130 |
| 2014/0239808 A1* | 8/2014 | Nava | .................. | H05B 37/0218 315/82 |
| 2014/0265874 A1* | 9/2014 | Marquardt | ......... | H05B 37/0254 315/153 |
| 2014/0285107 A1* | 9/2014 | Cavalcanti | ......... | H05B 37/0245 315/291 |
| 2015/0102747 A1* | 4/2015 | Wang | ........................ | H02J 3/14 315/294 |
| 2016/0007429 A1* | 1/2016 | Eskonen | ............ | H05B 37/0272 315/297 |

* cited by examiner

*Primary Examiner* — Tung X Le
*Assistant Examiner* — Raymond R Chai
(74) *Attorney, Agent, or Firm* — John L. Rogitz

(57) ABSTRACT

A two-way communication Geographic Lighting Central Management System (GLCMS) to determine roadway lighting performance. Points, lines, polygons, etc, are used to define multiple geographic features overlaid on each other in a municipality relationships to dynamically establish street lighting performance including brightness, color temperature, and light distribution. The geographic data is accessible through a wide range of sources, and the geographic relationship between the data sources determines the lighting performance. Geographically represented features include, but are not limited to, lighting and associated infrastructure, pedestrian conflict, crime, roadway classifications, intersection classifications, lighting layouts, vehicular traffic volumes and road surface reflectance classifications.

18 Claims, 8 Drawing Sheets

STREET AND ROADWAY LIGHTING DISTRIBUTION MAP

FIELD

The application relates generally to street light management.

BACKGROUND

Street light management primarily associates street lighting with elementary notions of road, street and intersection classifications, such as whether a street light's illuminates a major or collector roadway. The lighting requirements of a municipality typically apply to many streetlights across a large geographic region, with municipality-selected factors being applied across the board to all lights within a region. As understood herein, a much more robust, centrally-controlled, and detailed street light management system is desirable.

SUMMARY

As understood herein, the above-described broad brush technique for municipality lighting means that, for example, basing a lighting design on a collector/collector intersection and then applying that design across a city makes it problematic to account for a wide number of variables such as differing crime rates, land use changes, sidewalks, etc, within the city.

Accordingly, among other things, present principles manage plural geographic layers such as street light infrastructure, land use, and street speed limits as separate layers which are related within a map to calculate a performance profile of street lights. The performance profile can include color temperature, brightness, and distribution type (area of illumination) of street lights. When laud use, as an example, changes, the corresponding land use layer in the rasp is updated a new performance profile for the lights affected by the change is calculated. This can ensure that the municipality advantageously provides consisted levels of level of service while meeting other lighting priorities including local lighting standards and/or national lighting standards such as those published in Illuminating Engineering Society Recommended Practices-8 (IES-RP-8) and Americas Association of State Highway and Transportation Officials Roadway Lighting Design Guide (AASHTO GL-6), maximizing energy efficiency, limiting lighting which contributes to light pollution, and providing illumination to discourage crime or impaired driving accidents.

Moreover, present principles provide an enterprise geographic information system (GIS) in which many mapping layers interact to meet various goals. For example, sensors may collect traffic information, and instead of using such traffic information merely to impact the performance of an individual, street light in real-time, present principles can aggregate such traffic information into average traffic for the road segment broken down by time of day, day of the week, or other increment and used as one of the map layers to interact, with, multiple other geographic factors to establish appropriate lighting.

Further, as mentioned above, the instant disclosure provides for mare than merely dimming a street light, over time, and further accounts for other factors to determine an optimum light output. As but one example of some of the details described farther below, color temperature of street lighting may be changed based on time of day, land use area, etc. As another example of lighting performance mentioned above, the light, distribution of a street light assembly may be managed to account for the geographic layers on a map. Dynamically adjusting light distribution, i.e., where the light from an assembly impinges on the ground, promotes uniformity standards and light level standards, while meeting other, (potentially competing) priorities, such as lowest energy use, Carbon Dioxide emissions, lengthening the life of fee light assembly, etc.

Other lighting performance parameters may include lamp driver heat, light assembly energy use, and whether the assembly lighting is completely deenergized or not (on or off). Still other lighting performance parameters may include luminance, illuminance, veiling luminance, and uniformity.

Accordingly, an apparatus includes at least one computer memory that is not a transitory signal and that includes instructions executable by at least one processor to receive at least first and second geographic regions representing respective first and second lighting requirements. The first and second geographic regions intersect each other to define an intersection area. The instructions are executable to establish a lighting performance from the first and second lighting requirements. The lighting performance is useful, to establish at least one illumination parameter of at least a first street light assembly positioned to direct, light into the intersection-area.

In examples, the illumination parameter can include color temperature and/or brightness and/or light distribution. The light distribution, information can be used by the first street light assembly to illuminate a subset of illumination elements in the first street light assembly, with the subset establishing to the light distribution. Alternatively, the structure of the assembly may be energized and a mechanical shutter engaged with the assembly and moved as appropriate to partially cover the illumination structure to shield parts of the ground from illumination. As mentioned above, other illumination parameters may include lamp driver heat, light assembly energy use and whether the assembly lighting is completely deenergized or not (on or off).

In examples, geographic regions may be used in combination with each other as conceptually understood by overlaying maps onto each other, with each map representing a characteristic parameter associated with geographic locations in the region. The parameters may include crime levels in the region, street types in the region, road intersections in the region non-intersection segments of roadways in the region, and surface reflectances in the region. In implementation, a central management server may access a data structure that correlates multiple geographic locations with respective characteristic parameters discussed, herein as an implementation of the map concept. A characteristic parameter may change according to the time of day or day of the week.

The lighting performance may be established to satisfy a local or national lighting standard. The first and second geographic region information may be received from a geospatial information engine.

In another aspect, a system includes plural processor-controlled street light assemblies (SLA) distributed in a geographic region. At least one management server is configured for communicating with at least some of the SLA to control at least two of: brightness, color temperature, light distribution output by at least some of the SLA based at least in part on at least one data structure correlating a geographic location with at least first and second lighting requirements.

In another aspect, a method includes, for each of plural geographic locations, accessing a data structure correlating lighting requirements to the respective geographic locations. The method includes using the lighting requirements to determine lighting performance for at least one street light assembly in each of the plural geographic locations, and communicating the lighting performance to each of the street light assemblies to establish a light output at each of the street light assemblies according to the lighting performance.

The details of the present application, both as to its structure and operation, can best be understood, in reference to the accompanying drawings, in which like reference numerals refer to like parts, and in which:

DETAILED DESCRIPTION

Figure 1:
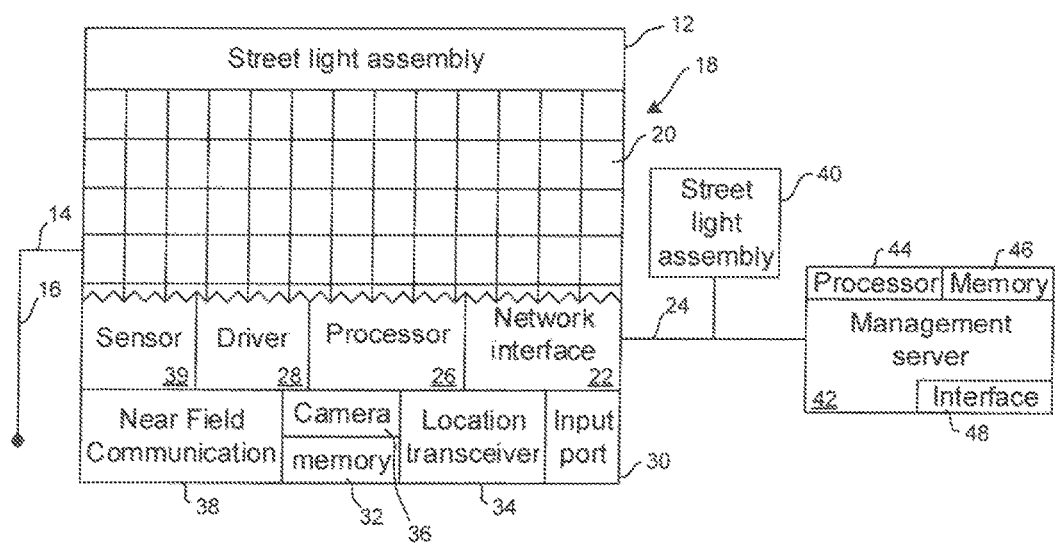
FIG. 1 is a block diagram of an example system in accordance with present principles.

This disclosure relates generally to computer ecosystems including aspects of street light management systems. A system herein may include server and client components, connected over a network such that data may be exchanged between the client and server components. The client components may include one or more computing devices including processor controllers in individual street light assemblies and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications.

Servers and/or gateways may include one or more processors executing instruction that configure the servers to receive and transmit data over a network such, as the Internet. Or, a client and server can be connected over a local intranet or a virtual private network.

Information may be exchanged over a network between the clients and servers. To this end and for security, servers and/or cheats can include firewalls, load balancers, temporary storages, and proxies, and other network infrastructure for reliability and security. One or more servers may form an apparatus that implement methods of providing a secure community to network members.

As used herein, instructions refer to computer-implemented steps for processing information in the system. Instructions can be implemented in software, firmware or hardware and include any type of programmed step undertaken, by components of the system.

A processor may be any conventional general purpose single- or multi-chip processor that can execute logic by means of various lines such as address lines, data lines, and control, lines- and registers and shift registers to perform operations on data including but not limited to addition, subtraction, multiplication, division, and logarithmic operations.

Software modules described by way of the flow charts and user interfaces herein can include various sub-routines, procedures, etc. Without limiting the disclosure, logic stated, to be executed by a particular module can be redistributed to other software modules and/or combined together in a single module and/or made available in a shareable library.

Present principles described herein can be implemented as hardware, software, firmware, or combinations thereof hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FFGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes, systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance wife present principles. The first of the example devices included in the system 10 is a street light assembly 12. It is to be understood that the assembly 12 is configured to undertake present principles (e.g. communicate wife other network devices such as a central management server and/or other streetlight assemblies in a mesh network to undertake present principles, execute the logic described herein, and perform any other functions and/or operations described herein).

Accordingly, to undertake such principles the example assembly 12 can be established by some or all of the components shown in FIG. 1. Typically, the assembly 12 includes one or more lamps that are elevated off the ground by means of being mounted on a horizontal mast arm 14 that is coupled to an upper segment of a vertical pole 16, although some assemblies may not have mast arms. In the example shown, the assembly 12 includes a matrix-like array 18 of individually addressable light emitting diodes (LED) 20, with the array 18 typically oriented horizontally facing down toward the ground, although in some embodiments the array 18 can be tilted at an oblique angle with respect to the horizontal. The LEDs 20 can be individually colored or individually controlled to emit demanded colors, such that the LEDs can be controlled to emit various combinations of blue light, white light, red light, green light etc. It is to be understood that lamps other than LEDs may be used, e.g., incandescent lamps or other types of lamps such as fluorescent lamps, high intensity discharge (HID) lamps, low energy sodium (LES) lamps. Mercury vapor lamps, metal halide lamps, high pressure sodium (HPS) lamps, Low Pressure Sodium (LPS), induction lights, and that one or more lamps per street tight assembly may be provided.

The assembly 12 may include one or more network interfaces 22 for communication over at least one network 24 such as the Internet, a WAN, a LAM (including mesh networks), etc. under control of one or more processors 26. Thus, fee interface 22 may be, without limitation, a Wi-Fi transceiver, which is an example of a wireless computer network interface; such as but not limited to a mesh network transceiver. It is to be understood that the processor 26 controls, through driver circuitry 28 in some embodiments, the lamp or lamps 20 according to present principles. Furthermore, note the network interface 22 may be, e.g., a wired or wireless modem or router, or other appropriate interface such as, e.g., a wireless telephony transceiver, or Wi-Fi transceiver as mentioned above, etc.

In addition to the foregoing, the assembly 12 may also include one or more input ports 30 such as, e.g., a high definition multimedia interface (HDMI) port or a USB port to physically connect (e.g., using a wired connection) to another device. The assembly 12 may further include one or more computer memories 32 such as disk-based or solid state storage that are not transitory signals. Also its some embodiments, the assembly 12 can include a position or location transceiver 34 such as but not limited to a cellphone receiver, GPS receiver and/or altimeter that is configured to receive and/or transmit geographic position information from at least one satellite or cellphone tower and provide the information to the processor 26. However, it is to be understood that another suitable position receiver other than a cellphone receiver, GPS receiver and/or altimeter may be used in accordance with present principles.

Continuing the description of the assembly 12, in some embodiments the assembly 12 may include one or more cameras 36 that may be, e.g., a thermal imaging camera, a digital camera such as a webcam and controllable by the processor 26 to gather pictures/images and/or video. A Near Field Communication (NFC) element 38 may be included in the assembly 12 for communication with other devices using NFC. An example NFC element can be a radio frequency identification (RFID) element or a Bluetooth transceiver. In addition to the camera 36, the assembly 12 may include one or more other sensors 39 such as light sensors, voltage or current sensors, temperature sensors, etc, for providing feedback of lighting performance as discussed further below.

In the example shown, to illustrate present principles one or more other street light assemblies (SLA) 40 may be included in a municipal street light system and may accordingly communicate over the network 24 as shown. One or more SLA management servers 42 may also communicate on the network 24 to control the SLAs 12, 40 according to principles divulged herein. The SLAs 12, 40 may include some or all of the components discussed above in the case of the assembly 12. Without limitation, communication, between components herein may be by RF mesh networks, powerline transceivers, backhaul networks, gateways, broadband point-to-point cellular connection, local Wi-Fi access.

The one or more management servers 42 typically includes at least one server processor 44, at least one computer memory 46 such as disk-based or solid state storage, and at least one network interface 48 that, under control of the server processor 44, allows for communication with the other devices of FIG. 1 over the network 24, and indeed may facilitate communication between servers and client devices in accordance with present principles. Note that the network interface 48 may be, e.g., a wired or wireless modem or router, Wi-Fi transceiver, or other appropriate interface such as, e.g., a wireless telephony transceiver. Accordingly, in some embodiments the server 42 may be an Internet server, and may include and perform "cloud" functions such that the devices of the system 10 may access a "cloud" environment via the server 42 in example embodiments. Typically, cloud serves may include real and virtual storage, network interface cards, GPUs, RAM and other hardware.

Figure 2:
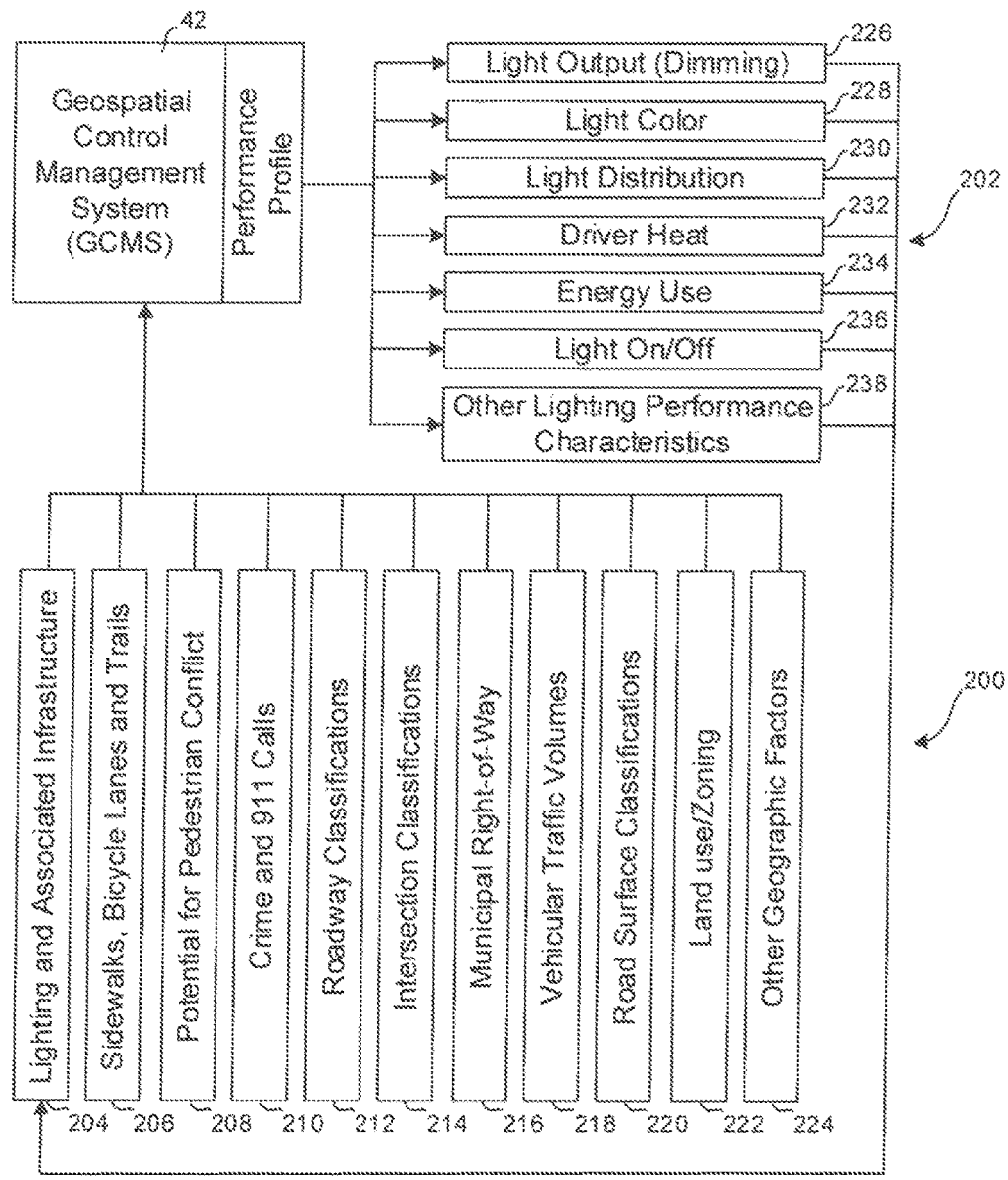
FIG. 2 is a block diagram schematically showing inputs to the central management system, also referred to herein as the geospatial control management system (GCMS) and embodied in FIG. 1 as the management server, and showing various outputs that may constitute the lighting performance demanded of the lighting assemblies to which the outputs are sent.

Now referring to FIG. 2, a system includes one or more of the above-described servers 42 implementing a geospatial control management system (GCMS) for controlling street light assemblies hi a municipality. The GCMS receives as input lighting requirements 200 and based on the lighting requirements outputs messages to street light, assemblies via a computer network such as any described herein containing lighting performances 202.

A municipality may determine which lighting requirement or requirements it wishes to implement. In the example shown, the lighting requirements 200 include geographic locations and types of lighting and related infrastructure 204, as well as geographic locations of sidewalks, bicycle lanes, and pedestrian trails 206. The lighting requirements, may further include geographic locations of pedestrian conflicts 208, geographic locations of high crime and emergency calls 210, and geographic locations of roadways and their classifications 212, as detailed further below.

Also, in the example shown the lighting requirements may include geographic locations intersections and their classifications 214, geographic locations of municipal rights of way 216 and the traffic volumes 218 for various geographic locations. The lighting requirements may also include geographic locations of road surfaces and their classifications 220, e.g., reflective or absorptive of light (which may be characterized as predicting visibility level and pavement luminance), geographic locations of various types of land uses/zoning 222, and geographic locations of other factors 224. Note that lighting requirements may also take into account areas which should not be illuminated to limit light trespass into those areas, and thus areas outside the municipal right-of-way may also be taken into account.

The lighting performances 202 that are based on the lighting requirements 200 may include brightness 226, color temperature 228, and light distribution 230, which is further discussed below. The lighting performances may additionally include a maximum component temperature 232 within a light assembly such as a maximum LED driver temperature, and a maximum energy use ceiling 234 that a light assembly should not exceed, in amperes, for example. A light on/off parameter 236 may also be included to completely deenergize or at least partially energize the light assembly receiving the lighting performance message from the server 42. Other parameters 236 may be included in the message.

Figure 3:
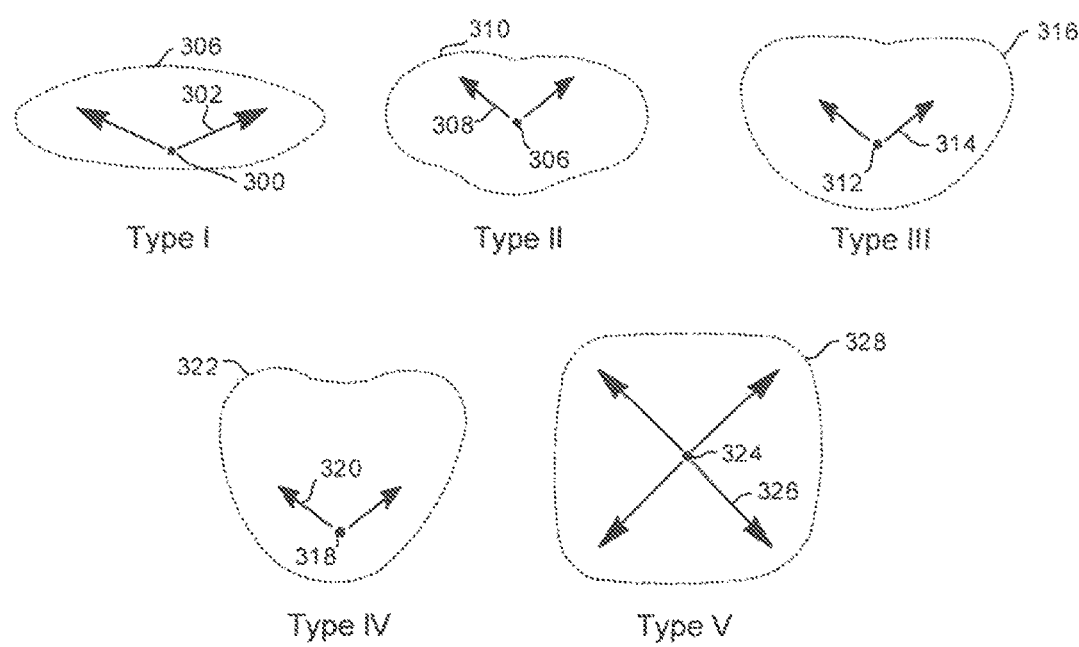
FIG. 3 is a schematic diagram illustrating example light distributions from a lighting assembly.

FIG. 3 illustrates examples of types of light distribution that a street light assembly might be configured to establish by, e.g., appropriately energizing some hut not all illumination elements such as LEDs within the street light assembly, or by moving a mechanical shutter on the assembly to screen portions of the illumination structure of the assembly. The particular light distribution may be established based on demanded light performance, for example, to illuminate a sidewalk under the assembly but not to illuminate residential land next to the sidewalk.

A street light assembly 300 (represented by a dot in FIG. 3) may direct light generally in the directions shown by the arrows 302 to illuminate an area 304 of ground under the assembly 300. As shown, the area 304 is generally shaped as an elongated oval. It is to be understood that the illuminated areas shown herein are rough approximations of the ground that would be illuminated when subsets of the illumination elements of the light assemblies are correspondingly illuminated. Typically, the amount of light which fells on the ground is not uniform. This can be represented by "contours", so-called "Isolux Contours", or a "cloropleth map". While actual lighting distributions can vary dramatically, they are generally classified into the five types shown in FIG. 3.

On the other hand, a street light assembly 306 may direct light generally in the directions shown by the arrows 308 to illuminate an area 310 of ground under the assembly. As shown, the area 310 is generally shaped as a relatively short oval with a bulge.

FIG. 3 also shows that a street light assembly 312 may direct light generally in the directions shown by the arrows 314 to illuminate an area 316 of ground under the assembly. As shown, the area 316 is generally kidney-shaped.

FIG. 3 additionally shows that a street light assembly 318 may direct light generally in the directions shown by the arrows 320 to illuminate an area 322 of ground under the assembly. As shown, the area 322 is generally heart-shaped.

Also, FIG. 3 shows that a street light assembly 324 may direct light generally in the directions shown by the arrows 326 to illuminate an area 328 of ground under the assembly. As shown, the area 328 is generally box-shaped. Thus, while the first four distribution patterns of FIG. 3 depend on illuminating only a subset and not all of the LEDs in a street light assembly to provide for directional lighting, in the fifth area 328 all LEDs are illuminated to provide for omnidirectional lighting.

FIGS. 4-7 illustrate in map form various parameters for establishing lighting requirements. Some municipalities may elect to use one or more of these parameters. When multiple parameters are selected and potentially demand competing lighting requirements for the same geographic location, the parameters may be prioritized, so that the lighting requirements of a higher priority parameter may be used in lien of the lighting requirements of a lower priority parameter. Or, the lighting requirements may be blended. For example, if a land use region is associated with a brightness of $X(1)$ and color temperature of $Y(1)$, but that same region is in an area designated "high crime" that is associated with a brightness of $X(2)$ and color temperature of $Y(2)$, the street light assembly or assemblies in that region may be commanded by the server 42 to establish an average brightness between $X(1)$ and $X(2)$ and average color temperature between $Y(1)$ and $Y(2)$. Yet again, the system operator (e.g., municipality) may determine to default, in the presence of competing lighting requirements for the same geographic location, to the lighting requirement wife the highest, brightness and color temperature.

Other heuristics for resolving conflicts in lighting requirements for a single geographic location may fee used. For example, lighting requirements for parameters selected by the municipality to determine lighting requirements may be weighted as shown in the table below, with weights potentially changing based on time of day and other factors:

|  | RP-8 and Energy Efficiency | Dark Skies with Driving | Crime Prevention and Energy Efficiency |
|---|---|---|---|
| IES RP-8 Compliance | Y | N | 0 |
| AASHTO GL-6 Compliance | N | N | 0 |
| Energy Efficiency | 100 | 0 | 25 |
| Municipal ROW type | 0 | 50 | 0 |
| Road type | 0 | 50 | 0 |
| Crime | 0 | 0 | 75 |
| Bike lane | 0 | 0 | 0 |
| Pedestrian conflict | 0 | 0 | 0 |
| Maximize Fixture life | 0 | 0 | 0 |
| Minimize Light Trespass | 0 | 0 | 0 |

Figure 4:
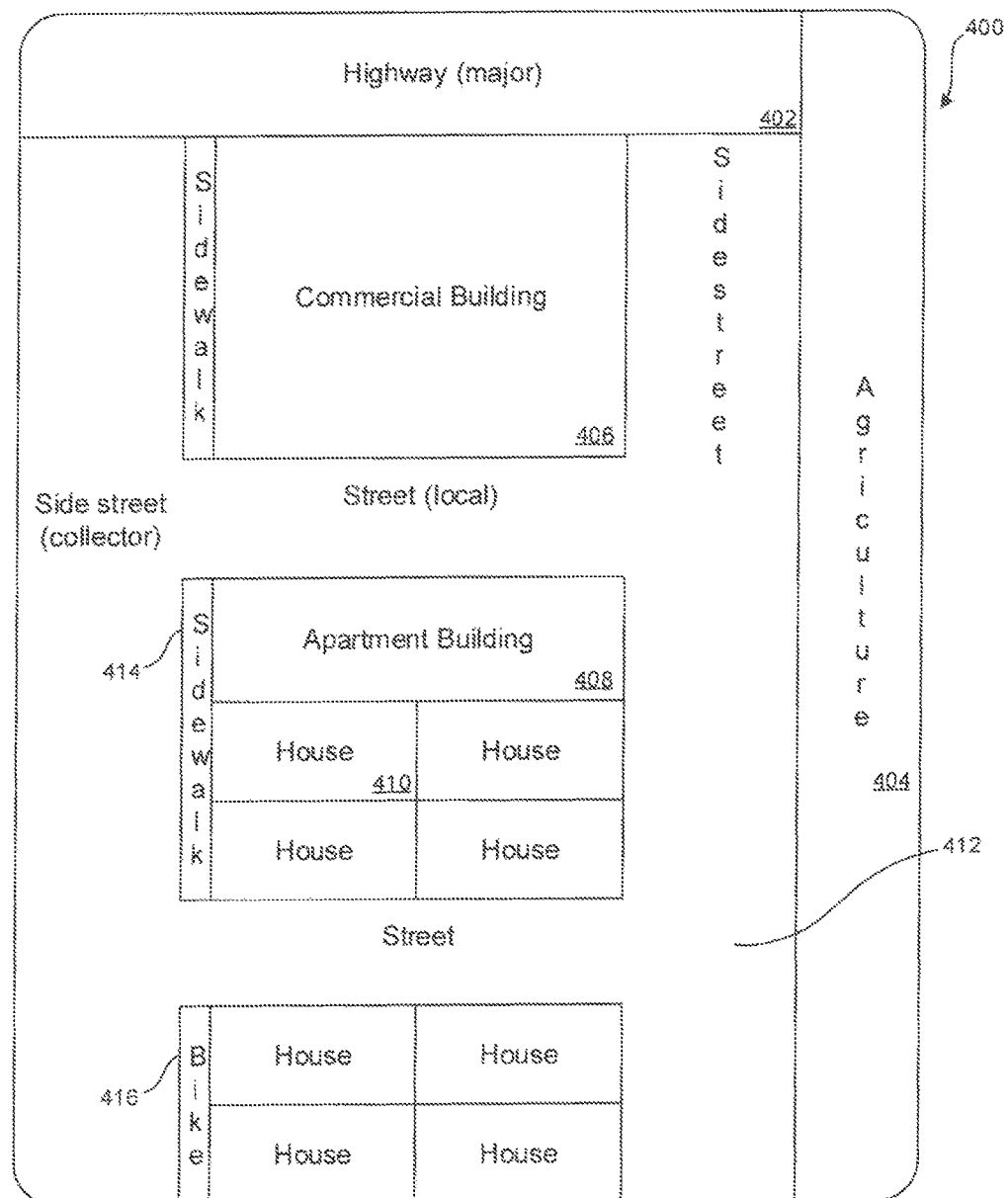
FIG. 4 is a schematic diagram showing land use and road classifications in a municipality in a map format that can be electronically stored.

FIG. 4 illustrates, in map form 400, land use and road classification that can be used to establish lighting requirements. As shown, a geographic area 402 is classified as "highway" based on, e.g., measured traffic volume, signifying a major traffic artery that may be associated with relatively bright lighting requirements and high color temperature. A land use region 404 is classified as "agriculture", signifying land that may have no lighting requirement. Another land use region 406 is classified as a commercial building, which may be associated with relatively bright lighting and high color temperature.

Yet another land use region 408 is classified as "apartment building", which may be associated with medium brightness and medium or low color temperature, while a land use region 410 is classified as single family residential ("house"), in examples signifying low brightness and low color temperature requirements.

A side street 412, which may be classified as a collector street based on, e.g., measured traffic volume, may be associated with medium brightness and medium color temperature, whereas other streets classified as "local" based on, e.g., low posted speed limits and/or traffic volume may signify low brightness and low color temperature. Sidewalks 414 and bicycle lanes 416 may be associated with medium brightness.

Road classification may be according to those set forth in the above-referenced IES RP-8, or other lighting standard.

Note that road classification may change based on time of day or day of the week, and with the classification change, the lighting requirements may change. For example, a street may change from major to collector at 1 A.M. in the morning until, daylight, and then revert to major from sundown until 1 A.M.

Other land use regions with associated lighting performances may be used. For example, observatory butter regions may be implemented in which street light brightness is dimmed and/or color temperature is lowered.

Figure 5:
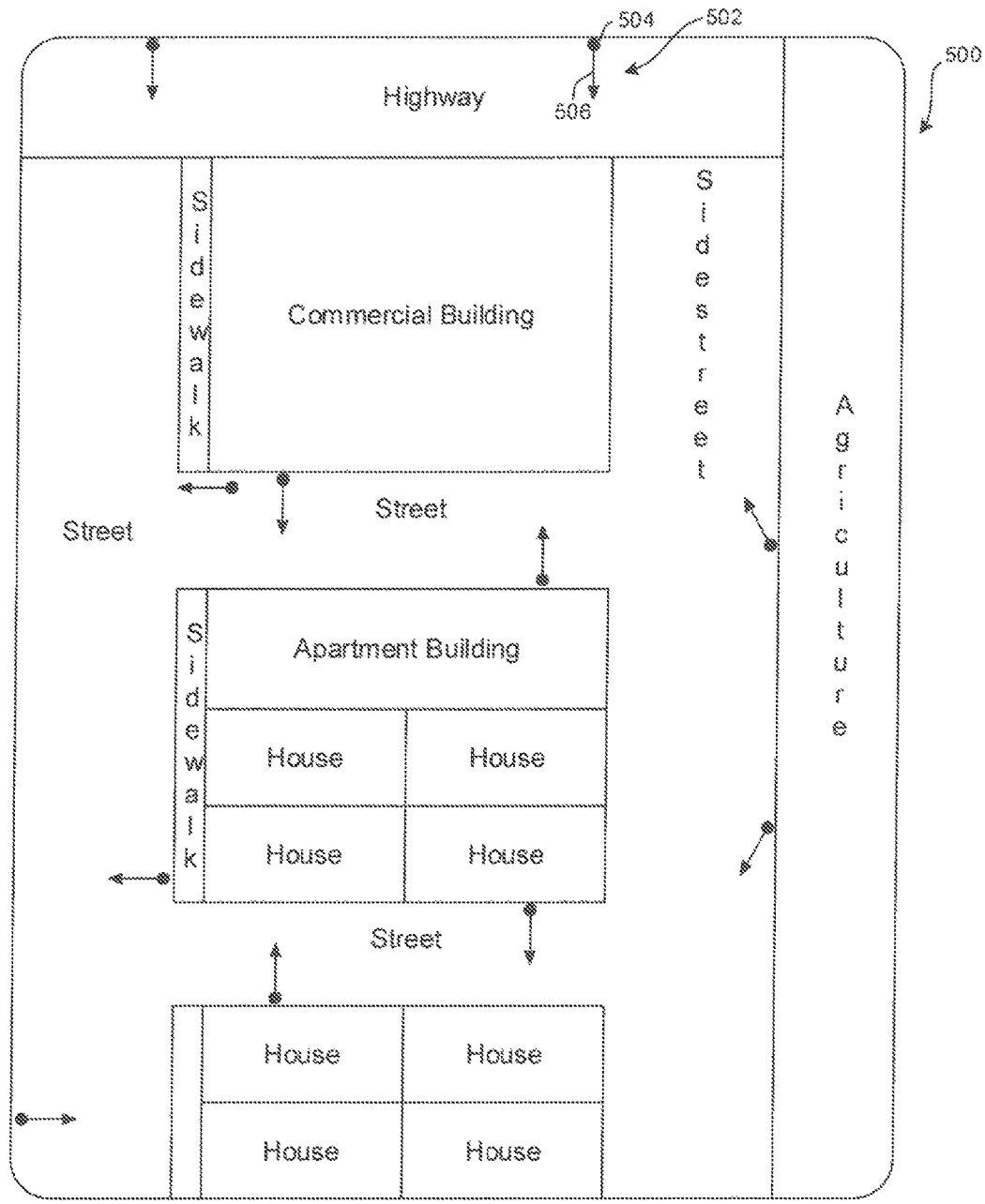
FIG. 5 is a schematic diagram of a street light assembly map overlaid on the map of FIG. 4, which in turn may be combined as by electronic overlay with any of the other maps discussed herein.

FIG. 5 shows a map 500 of street light assemblies, overlaid on the land, use/road classification map 400 of FIG. 4. As shown, a street light assembly 502 may be located, at where the vertical pole 504 is geographically located with its mast arm 506 also illustrated or recorded. Group relationships may be established such as spacing lines between streetlights that are intended to be managed in concert with each other. Pole spacing lines should not be drawn directly through private property. Average pole spacing numbers can be calculated based upon the average of all lines drawn from a single pole. Fox example, if an assembly is associated with four other assemblies located, respectively, 314, 245, 231 and 263 feet away, the average spacing for that assembly would be 263 feet.

Figure 6:
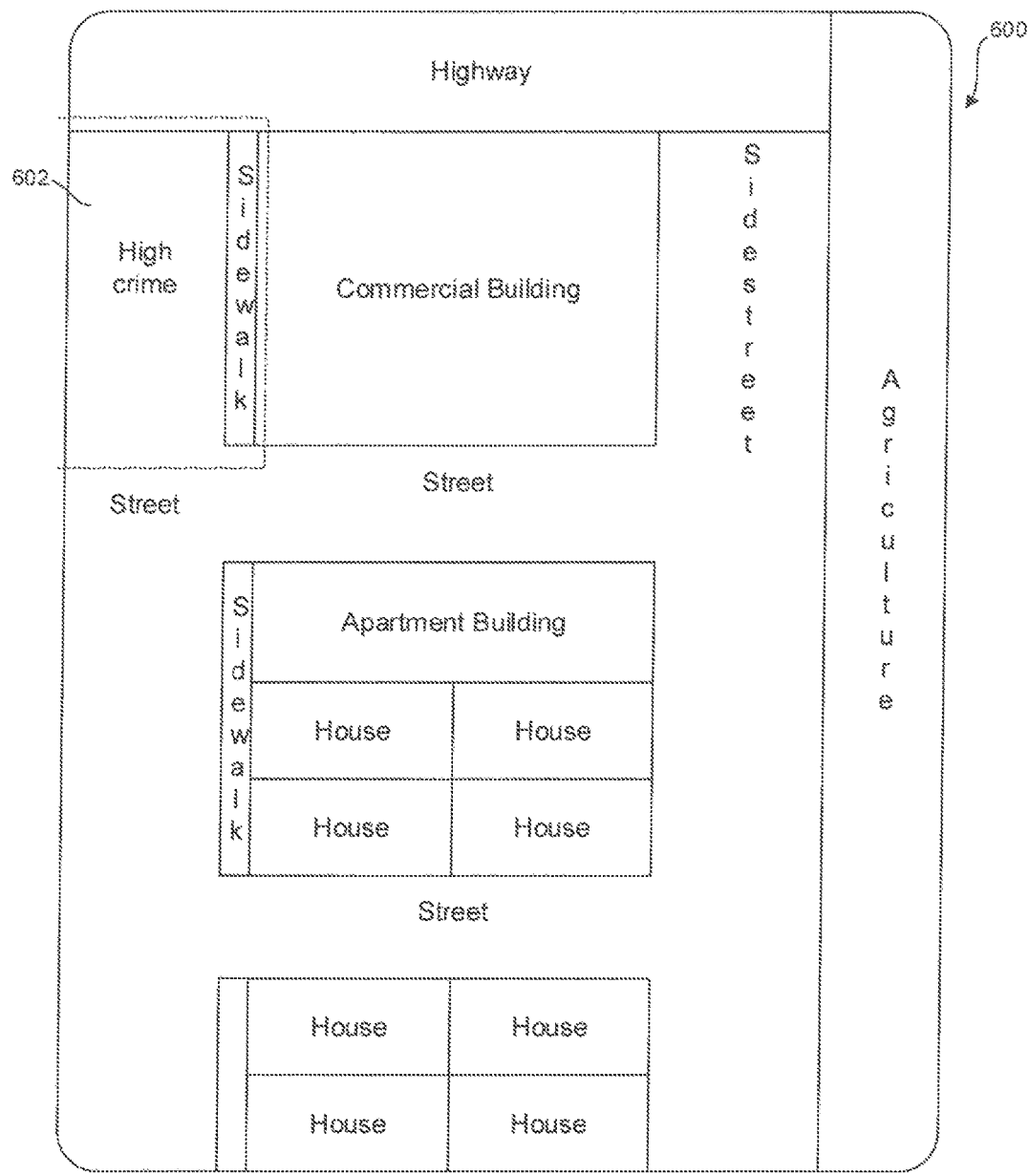
FIG. 6 is a schematic diagram of a crime area map overlaid on fee map of FIG. 4, which in turn may be combined as by electronic overlay with any of the other maps discussed herein.

FIG. 6 shows a map 600 of crime level areas, overlaid on the land, use/road classification map 400 of FIG. 4. As shown, a region 602 is designated "high crime" which may be associated with bright street lighting requirements and high color temperature. Other areas in the simplified map 600 may be considered low crime and thus may be associated with low brightness and color temperature from a crime level standpoint.

A crime density analysis may be done to classify areas on a 1 to 10 scale. For example, the Natural Breaks (Jenks) classification method may be used. While the Jenks method treats all crimes as equal, in some implementations only a subset of crimes such as burglary or assault may be considered, and other crime such as domestic violence or shoplifting may not be considered. Or, only crimes which occurred within the preceding N number of says may be considered in a geographic location so that the crime level classifications change on a periodic basis.

Figure 7:
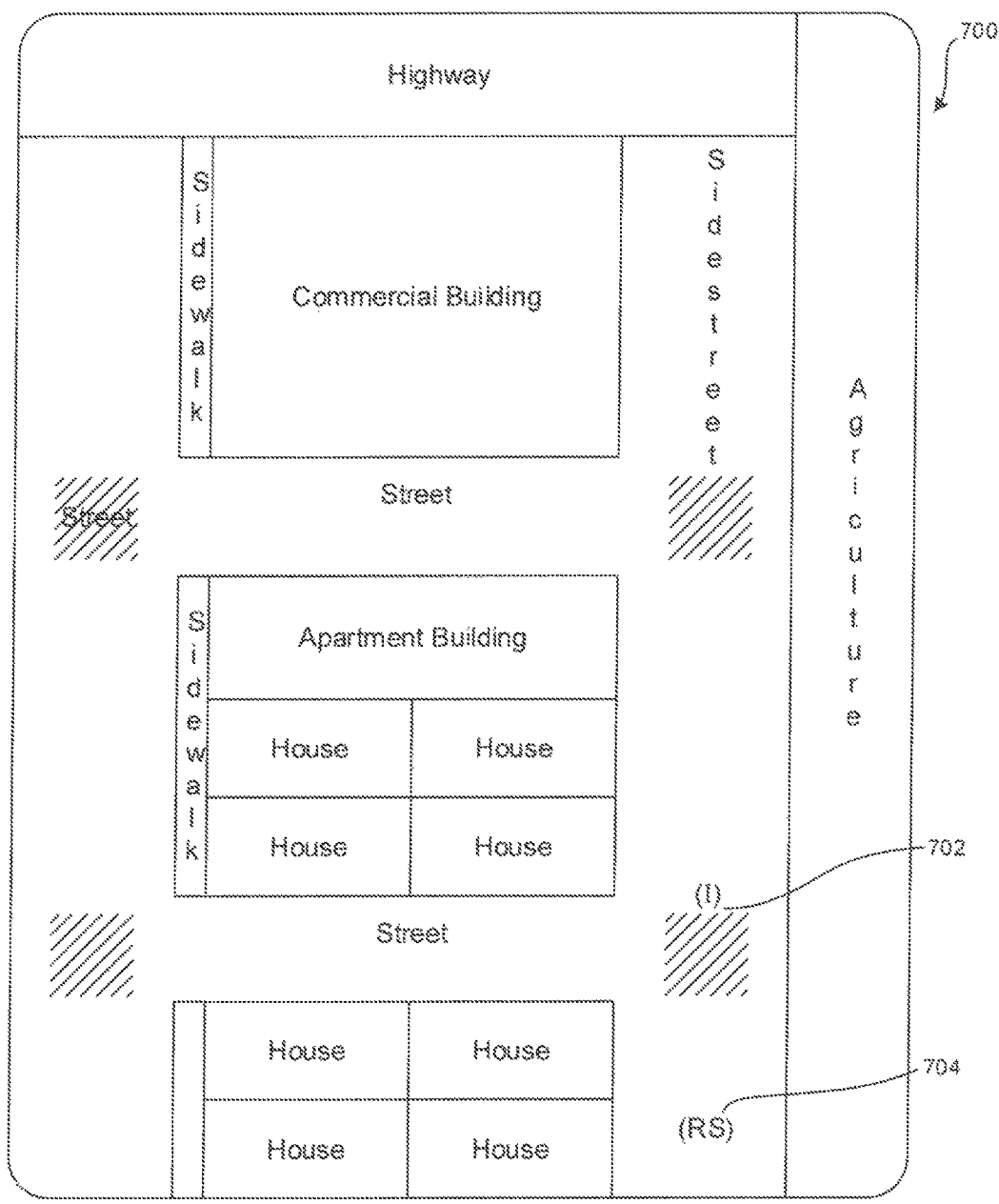
FIG. 7 is a schematic diagram of a municipality right of way map overlaid on the map of FIG. 4, which in turn may be combined as by electronic overlay with any of the other map discussed herein.

FIG. 7 shows a map 700 of street intersections 702 and municipal rights of way 704, overlaid on the land use/road classification map 400 of FIG. 4. As shown, geographic areas under a municipality's jurisdiction (the right-of-way) may be divided into intersection, road segments and sidewalks and other features. These areas can have different lighting levels and uniformity requirements. The municipal right-of-way can be created and categorized as road segments (RS) and intersections (I). Intersection areas can start at the beginning of the radius curve excluding turn lane, for example.

In non-limiting, examples, five rights of way categories may be established, each being associated potentially with its own respective lighting requirement. The categories may include local road segments, local/local intersections, collector road segments, collector/Local intersections, and collector/collector intersections. Moreover, the classifications can change by time of day, e.g., at midnight to sunrise all right of ways become either Local road segments or Local/Local intersections. Note that it may be assumed that vehicles are travelling in one direction on a street, with the various metrics calculated being based on the assumed direction the vehicles are travelling.

The potential for Pedestrian conflict and the ROW classification polygons can be overlaid (or otherwise associated with each other in a data structure) to place all areas within the right of way in one of the categories to the left of a pedestrian conflict area. If areas are outside the right of way, their brightness (luminance) may be zero. The table below illustrates:

| Target Lighting Category | Luminance |
| --- | --- |
| L-Low | 0.3 |
| C-Low | 0.4 |
| L-Med | 0.5 |
| C-Med | 0.6 |
| L-High | 0.6 |
| C-High | 0.8 |
| LL-Low | 0.8 |
| CL-Low | 1 |
| CC-Low | 1.2 |
| LL-Med | 1.4 |
| CL-Med | 1.6 |
| CC-Med | 1.8 |
| LL-High | 1.8 |
| CL-High | 2.1 |
| CC-High | 2.4 |

Figure 8:
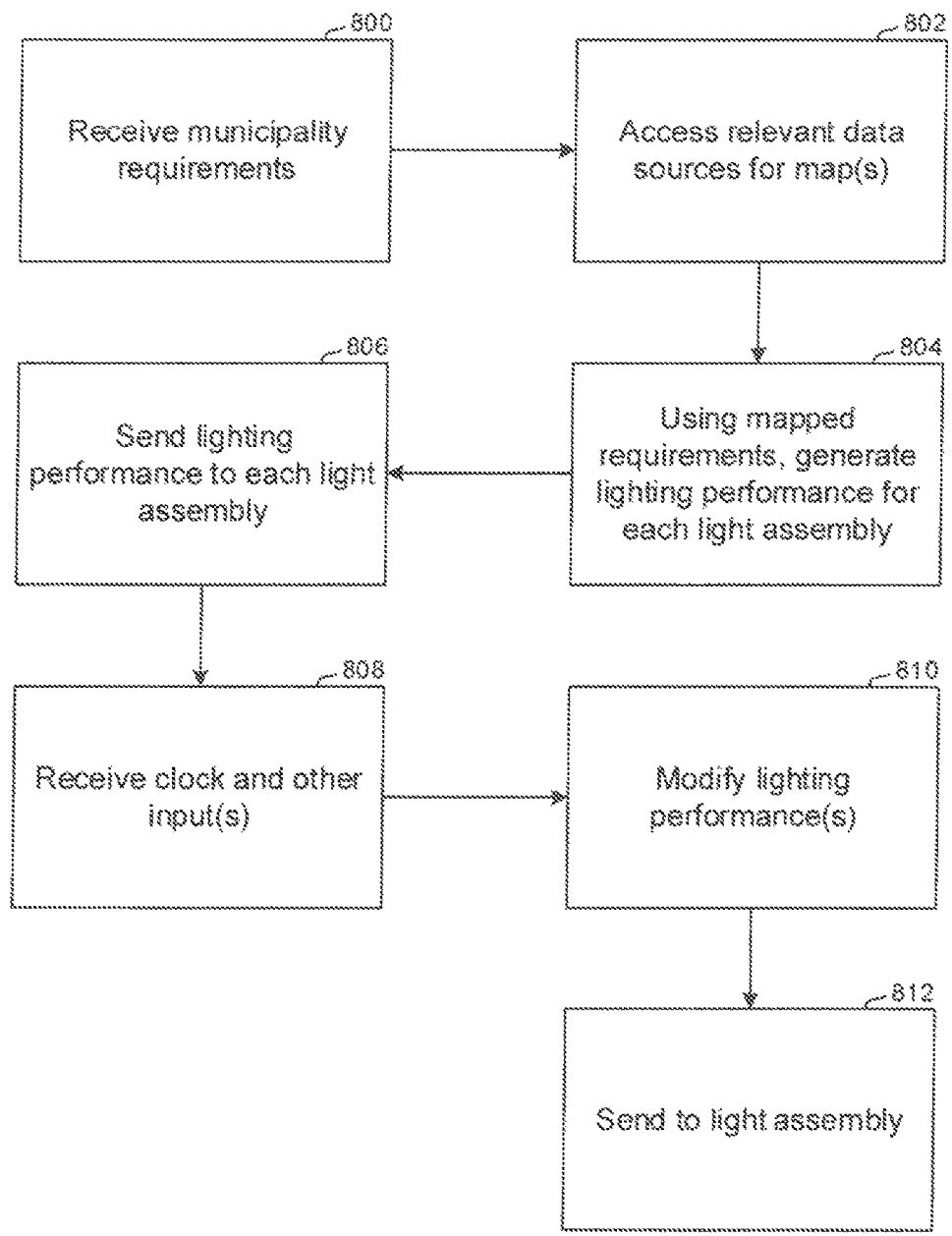
FIG. 8 is a flow chart of example logic.

Now referring to FIG. 8, commencing at block 800 the desired lighting requirements are received. These may include one or move of the requirements discussed herein and since most lighting is a municipal responsibility, the desired requirements are typically received from a municipality.

Essentially, a Target Lighting Layer is created based upon a municipality's priorities, with a performance profile then being sent to individual street lights to meet the target lighting layer as best as possible.

Proceeding to block 802, the relevant data sources are accessed and the values for the requirements obtained. For example, a crime database may be accessed to determine which reasons on the crime area map are high crime, etc, as described above. Similarly, land use data is accessed to designate areas on the land use map appropriately as are vehicle volume data and other data for roads to designate roads, sidewalks, etc. appropriately. As illustrated above, the values are used to construct maps such as those shown in FIGS. 4-7, which can be overlaid electronically on each other so that each geographic location within the municipality is correlated with the values of the selected lighting requirements at that location. As mentioned previously, in actual implementation a data structure such as a relational database or other data structure may be used to associate each geographic location with the values for its lighting requirements.

Moving to block 804, using the lighting requirements, the lighting performance for at least some and preferably all the light assemblies in the system are determined according to principles above. These lighting performances are sent at block 806 to the lighting assemblies via the system network, where the light assemblies configure themselves accordingly, e.g., by establishing a demanded brightness, color temperature, and light distribution.

Block 808 indicates that clock and other sensor may be received and the lighting performances modified accordingly at block 810. For example, depending on the time of day the lighting requirement value for an intersection or road might change and the associated lighting performance, change accordingly, and this modified lighting performance is sent to the respective lighting assemblies at block 812.

Other sensor data received at block 808 may include, e.g., pavement brightness, which can reduce the required illumination of the nearest light assemblies owing to reflectance, whether a light assembly is functioning correctly as determined by a heat or voltage or current sensor, which information can be used to cause nearby functioning assemblies to increase their brightness and/or alter their light distribution toward a malfunctioning assembly, etc.

A non-limiting example of a lighting performance message from the central management system to a light assembly may be given by the following XML message, it being understood that formats other than XML may be used:

```
<?xml version="1.0" encoding="UTF-8"?>
<CMS >
<lightActuator>
<lightStateChange>
<LightOutput>80</LightOutput>
<Distribution>49</Distribution>
<ColorTemp>2700</ColorTemp>
</requestDoc>
```

Use cases of the above principles include one or more of the following non-limiting examples.

In residential neighborhoods in the early evening when residents typically return home, color temperature may be in the blue or white range, which is more conducive to keeping people awake, and then later in the evening change to warmer temperatures such as red or green, which are more conducive to sleeping as well, as providing a more traditional feel reminiscent of legacy incandescent street lights.

In areas afflicted with a high degree of impaired driving, color temperature may be adjusted late at night toward the blue range to disrupt drivers' circadian rhythms and promote wakefulness.

In the middle of a street block where buildings are, lighting may be dimmed or turned off altogether.

Sidewalk lighting may be brighter than the lighting on the adjacent street, achievable by appropriately establishing the light distribution of a street light assembly that illuminates both the sidewalk and the street.

Street lights can be aggressively dimmed after a late night hour, e.g., after 2 AM in residential land use areas represented by polygons on the map, provided the residential areas are designated low crime, streets in the area are classified as "local", and the posted speed limit is lower than a threshold, such as 25 MPH. As in other implementations, a street light assembly may be represented by a point with a line extruding at an angle. The point represents where the pole meets the ground, the line represents the direction and length of the mast arm. In this example, street light assemblies that fall within both residential laud use polygons and low crime polygons, in which the respective mast arm angle is pointing towards a street fine classified as "local" and is also pointing toward a street line where the speed limit is less than 25 MPH, would be candidates to be adjusted to meet the lighting performance criteria, which is sent to the street light assembly to dim aggressively after the designated late night hour.

Another example is where communication from the node can inform better lighting, in the event the street light goes out, the lighting distribution of adjacent lights is adjusted by the central management system to provide more lighting uniformity. Once again, street lights may be represented as points with a line representing the mast arm. The municipality's right-of-way can be represented by a polygon. When a light goes out the lighting levels within the right-of-way are changed for assemblies in the area. The defective assembly can send a message to the central management system regarding the performance, or lack thereof, of the out light and will therefore be represented as such within the central management system. The central management system analyzes the lighting levels and sends new performance profiles to the adjacent lights. The new performance profiles increase the light output and change distribution patterns of the functioning assemblies to accommodate the lack of light in the area where the defective assembly is located. After the defective light assembly is fixed and back on the central management system creates new performance profiles, which are sent back to the street light assemblies.

As an additional example use ease, a municipality may desire only to comply with a lighting standard such as IES-RP-8 while maximizing energy savings. The central management system thus identifies the minimum lighting standards to meet IES-RP-8 compliance while the color temperature of the light assemblies may primarily be greater than 3000 Kv to place the most foot candles within the municipality's right of way to expend the least amount of energy, and therefore effect the most energy savings. In this case, none of the other geographic features or factors mentioned above need be considered.

As a further example use case, a municipality may desire to preserve a traditional, light color to further high dark skies priorities. In such an example, color temperature of light assemblies is adjusted to mimic traditional street light colors while brightness is lowered as appropriate for dark sky effect.

In another use case, areas within a threshold radius of commercial businesses may be considered to be areas of potential pedestrian conflict. Areas of N or more commercial properties together may be considered high pedestrian conflict while areas with less than commercial properties may be considered to be medium pedestrian conflict, with remaining areas considered low pedestrian conflict. Pedestrian conflict factors may be in effect only while the commercial stores are open, after which ail areas are considered to be low conflict. The brightest light may be established for area of high pedestrian conflict while the least bright light may be established for areas of low pedestrian conflict.

It will be appreciated that whilst present principals have been described with reference to some example embodiments, these are not intended to be limiting, and that various alternative arrangements may be used to implement the subject matter claimed herein.

What is claimed is:

1. An apparatus comprising:
   at least one computer memory that is not a transitory signal and that comprises instructions executable by at least one processor to:

identify at least a first and a second geographic regions representing a first and a second lighting requirements respectively, the first and second geographic regions intersecting each other to define an intersection area;

identify a lighting performance for the intersection area from the first and second lighting requirements, the lighting performance defining at least one illumination parameter of at least a first street light assembly (SLA) positioned to direct light into the intersection area and not being the same as the lighting requirements of the first and second geographic regions;

establish at least a first light distribution output by the first SLA by activating a first set of light emitters of the first SLA to output light in a first pattern onto the ground and establish a second light distribution for the first SLA by activating a second set of light emitters of the first SLA to output light in a second pattern onto the ground, the first set of light emitters not being equal to the second set of light emitters, the first pattern not being the same as the second pattern.

2. The apparatus of claim 1, wherein the illumination parameter includes color temperature.

3. The apparatus of claim 1, wherein the illumination parameter includes brightness.

4. The apparatus of claim 1, wherein the illumination parameter includes light distribution information.

5. The apparatus of claim 1, wherein the first geographic region representing the first lighting requirement represents a crime level in the first geographic region.

6. The apparatus of claim 1, wherein the first geographic region representing the first lighting requirement represents a street type in the first geographic region.

7. The apparatus of claim 1, wherein the first geographic region representing the first lighting requirement represents a road intersection in the first geographic region.

8. The apparatus of claim 1, wherein the first geographic region representing the first lighting requirement represents a non-intersection segment of roadway in the first geographic region.

9. The apparatus of claim 1, wherein the first geographic region representing the first lighting requirement represents a surface reflectance in the first geographic region.

10. The apparatus of claim 1, wherein the lighting performance is established to satisfy a local or national lighting standard.

11. The apparatus of claim 1, wherein the first and second geographic regions are received from a geospatial information engine.

12. The apparatus of claim 1, comprising the at least one processor, the at least one processor being implemented in a central management server configured to communicate with the first street light assembly over a computer network.

13. A system comprising:

a plurality of processor-controlled street light assemblies (SLA) distributed in a geographic region; and at least one management server configured for communicating with at least one of the SLA to control at least two of: brightness, color temperature, light distribution output by at least some of the SLA based at least in part on at least one data structure correlating a geographic location comprising at least a first and a second regions representing a first and a second lighting requirements respectively, the first and second regions intersecting each other to define an intersection area;

the management server being configured to establish a lighting performance for the intersection area from the first and second lighting requirements, the lighting performance for the intersection area not being the same as the lighting requirements of the first and second geographic regions;

wherein the at least one management server is configured with instructions for communicating with at least one of the SLA to control at least a light distribution output by at least one of the SLA, the management server being configured with instructions for establishing a first light distribution for a first SLA by activating a first set of light emitters of the first SLA to output light in a first pattern onto the ground, the management server being configured with instructions for establishing a second light distribution for the first SLA by activating a second set of light emitters of the first SLA to output light in a second pattern onto the ground, the first set of light emitters not being equal to the second set of light emitters, the first pattern not being the same as the second pattern.

14. The system of claim 13, wherein the data structure is associated with at least first and second electronic maps correlating geographic locations with the respective first and second lighting requirements.

15. The system of claim 13, wherein the at least one management server is configured for communicating with at least some of the SLA to control at least brightness output by at least some of the SLA.

16. The system of claim 13, wherein the at least one management server is configured for communicating with at least some of the SLA to control at least color temperature output by at least some of the SLA.

17. A method comprising:

accessing a data structure that correlates a lighting requirement to a geographic location, in a plurality of geographic locations;

using the lighting requirements, determining a lighting performance for at least one street light assembly (SLA) in a first geographic location comprising at least a first and a second regions representing respective first and second lighting requirements, the first and second regions intersecting each other to define an intersection area;

establishing a lighting performance for the intersection area from the first and second lighting requirements, the lighting performance for the intersection area not being the same as the lighting requirements of the first and second geographic regions;

communicating with at least some of the street light assemblies to establish a light output at respective the street light assemblies according to the lighting performance;

for a first street light assembly, activating a first set of light emitters to establish a first pattern of light distribution on the ground; and activating a second set of light emitters to establish a second pattern of light distribution on the ground; wherein the first set of light emitters not being equal to the second set of light emitters, the first pattern not being the same as the second pattern.

18. The method of claim 17, wherein the lighting performance includes brightness and at least one of color temperature, light distribution.

\* \* \* \* \*